United States Patent [19] [11] 4,307,443

Rettew, Jr. [45] Dec. 22, 1981

[54] MAGNETIC INDUCTION CONVERTER

[75] Inventor: Frederick Rettew, Jr., Lancaster, Pa.

[73] Assignee: Kenneth Gusic, Lancaster, Pa.

[21] Appl. No.: 127,255

[22] Filed: Mar. 4, 1980

[51] Int. Cl.[3] .............................................. H02M 7/58

[52] U.S. Cl. .................................................... 363/107

[58] Field of Search .................... 310/46; 363/32, 102, 363/106, 107, 109; 361/8, 13

[56] References Cited

U.S. PATENT DOCUMENTS 3,119,941 1/1964 Guiot .............................. 310/156 X 3,720,864 3/1973 Kolhagen ............................ 318/138

3,895,245 7/1975 Bode .................................... 310/66

*Primary Examiner*—William M. Shoop

*Attorney, Agent, or Firm*—Harvey B. Jacobson

[57] ABSTRACT

Permanent magnets of alternately opposite polar arrangement mounted on a rotor, pass in proximity to two stator elements, one of which is positioned non-radially relative to the rotor and acts as a driver. An induction coil mounted on the driver stator element is connected to a DC battery through a cam actuated, circuit controlling switch. The other stator element has a power output coil mounted thereon and within which AC current is induced.

15 Claims, 4 Drawing Figures

MAGNETIC INDUCTION CONVERTER

BACKGROUND OF THE INVENTION

This invention relates to an electrical machine through which an efficient conversion of energy is effected involving the use of a permanent magnet rotor.

Permanent magent rotor machines are well-known as disclosed for example in U.S. Pat. Nos. 928,214, 1,761,996, 3,174,088, 3,210,582 and 3,720,864. Generally, such machines includes one or more stator elements mounting induction coils connected to a DC battery source of voltage through some switching arrangement and are thereby operated as a stepping motor or ignition control. However, the arrangement of magnets on the rotor and the circuit connected to the induction coils produce operating characteristics unsuitable for efficient conversation of energy to meet the varying demands of an AC load.

It is therefore an object of the present invention to provide an electrical machine capable of efficiently converting energy for meeting varying demands of electrical AC loads.

SUMMARY OF THE INVENTION

In accordance with the present invention, a rotor is provided with spaced permanent magnets having alternate pole faces of opposite polarity aligned in parallel planes perpendicular to the rotor axis for cooperation with stator elements. One of the stator elements acting as a driver forms a flux path in a plane parallel to the rotor axis and intersecting the rotor in non-radial relation thereto to augment the torque produced in response to the forces of attraction and repulsion between the stator element and the permanent magnets. An induction coil on the driver stator element is connected to a DC battery through a circuit breaking switch actuated by a cam rotatable with the rotor so as to open the circuit to the battery when alternate magnets on the rotor are aligned with the stator element. The other stator element spans the distance between two adjacent magnets on the rotor to conduct a reversing flux and induce an output AC current in a power output coil.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
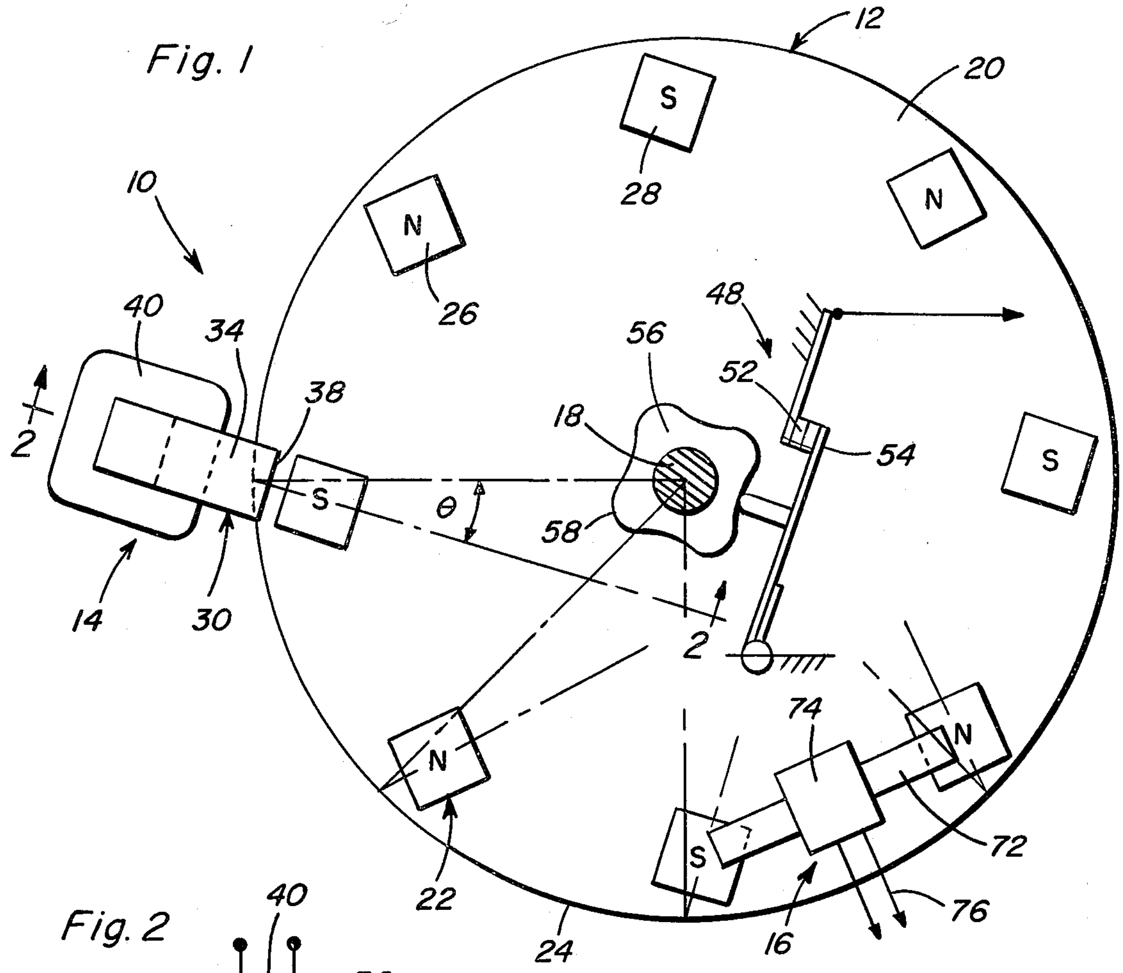
FIG. 1 is a somewhat simplified illustration of an electrical machine constructed in accordance with the present invention.
Figure 2:
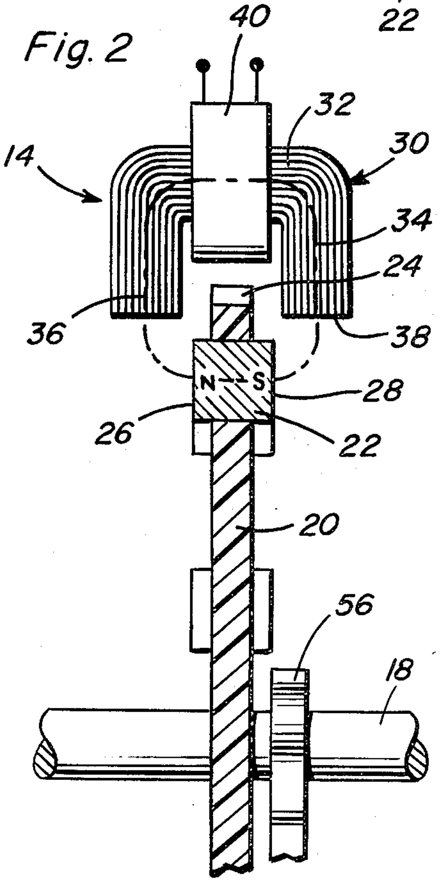
FIG. 2 is a partial section view taken substantially through a plane indicated by section line 2—2 in FIG. 1.

Referring now to the drawings in detail, FIGS. 1 and 2 show the basic arrangement for an electrical energy converter constructed in accordance with the present invention and generally denoted by reference numeral 10. The converter includes a rotor generally referred to by reference numeral 12 and a driver stator assembly 14. AC electrical power may be drawn from the converter through an output stator assembly 16. The stator assemblies 14 and 16 are fixedly mounted in spaced relation to each other and in operative relation to the rotor which is rotatable about a fixed rotor axis extending through a rotor shaft 18.

The rotor includes a planar disc 20 fixed to shaft 18 and made of a non-magnetic material. A plurality of permanent magnets 22 are fixedly mounted on the rotor disc adjacent its periphery 24. Each magent has pole faces 26 and 28 of opposite polarity. The pole faces are disposed on opposite sides of the rotor disc in parallel planes perpendicular to the rotor axis. The magnets are so arranged that alternate pole faces 26 and 28 on each side of the rotor disc are of opposite polarity as shown in FIG. 1.

As the rotor is rotated, the permanent magnets 22 sequentially pass the stator assembly 14 which is electromagnetically polarized so that the magnets 22 are alternatively attracted to and repelled from the stator assembly 14 because of the opposite polarity of the alternate pole faces 26 and 28. The stator assembly 14 includes a U-shaped stator core element 30 having an intermediate portion 32 and a pair of leg portions 34 extending therefrom to straddle the periphery 24 of the rotor disc 20. A magnetic flux path 36 is thereby established in a plane parallel to the rotor axis and non-radially intersecting the rotor disc at an angle $\Theta$ to the radial direction as shown in FIG. 1. The stator core element 30 is made of laminations of magnetic material, such as grain oriented steel, that extend parallel to the flux path as shown in FIG. 2. A magnetic circuit is formed by the flux path 36 and alternate magnets 22, when aligned with the stator assembly, through flux gaps between the pole faces 26 and 28 and the adjacent pole ends 38 of the leg portions 34 of the stator core element. The polarity or direction of the flux circuit is determined by the DC current conducted through an induction coil 40 mounted on the intermediate portion 32 of the stator core element 30.

Figure 3:
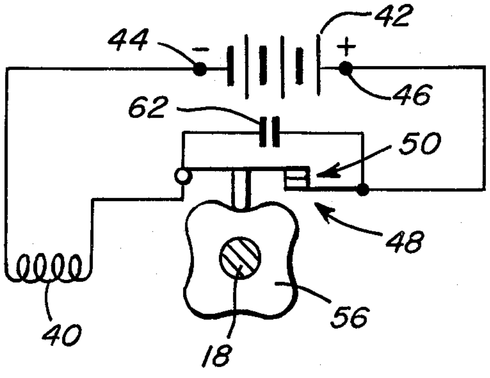
FIG. 3 is an electrical circuit diagram associated with the machine shown in FIGS. 1 and 2.

As shown in FIG. 3, the induction coil is connected to an energy storing circuit which includes a DC wet cell battery 42 having a negative terminal 44 and a positive terminal 46. One end of the coil 40 is connected to the negative battery terminal 44 while the other end is connected to the positive terminal 46 in series with a DC current interrupting control device generally referred to by reference numeral 48. In the illustrated embodiment, the control device 48 includes a normally closed switch 50 having a fixed contact 52 and a movable contact 54. The movable contact is displaced from its closed position by a radial, switch acutating arm 56 fixed to the rotor shaft 18. In the illustrated embodiment, the radial cam 56 is provided with four cam lobes 58 engageable with a switch follower arm 60 to open the circuit four times each revolution of the rotor, which is provided with eight permanent magnets 22. To minimize arcing, a paper capacitor 62 is connected across the switch contacts 52 and 54 of switch 50.

Figure 4:
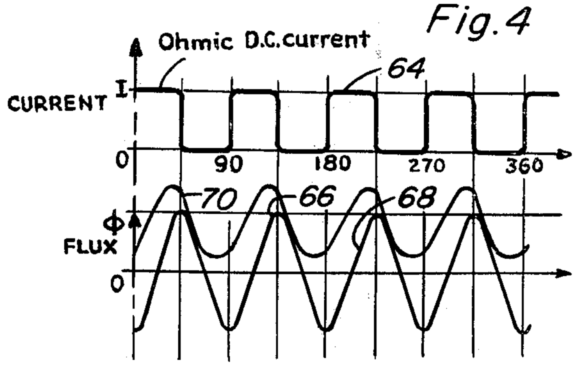
FIG. 4 is a graphical illustration of certain projected electrical and magnetic relationships associated with the present invention.

The cam 56 is angularly positioned relative to the rotor so that the circuit is opened each time magnetic flux of peak flux density is conducted through the stator element 30 corresponding to alignment of alternate magnets 22 therewith during rotation of the rotor. The DC ohmic current conducted through the induction coil 40 will therefore vary as shown by curve 64 in FIG. 4 which depicts interruption of current in synchronism with peak points 66 on flux density curve 68 which normally characterizes the attraction and repulsion of alternate magnets 22 to the stator element 30 during rotation of the rotor. Because of the induced current effect of switch 50 on the coil 40 and the DC potential applied by battery 42, the magnetic flux flow between the stator element 30 and the moving magnets 22 is modified by a collapsing field in the stator element repelling the magnets attracted thereto as depicted by the projected resultant flux density curve 70 in FIG. 4. A unidirectional torque on the rotor is thereby induced, augmented by the non-radial alignment of the stator element 30 as aforementioned. Also, the resultant current induced in the coil 40 is such as to conserve energy withdrawn from the battery 42 while the converter 10 is delivering electrical power to a load.

Electrical power in the form of AC current is delivered to a load by the output stator assembly 16 which includes a core element 72 positioned to span opposite polarity pole faces 26 and 28 of adjacent magnets 22 on the rotor disc as shown in FIG. 1. Thus, AC current will be induced in the power output coil 74 mounted on the element 72, as reversing magnetic flux is conducted therethrough during rotation of the rotor. The coil 74 is connected to a load by the conductors 76 extending therefrom.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An electrical energy converter, including a rotor, an electromagnetic device having a flux conducting stator fixedly positioned in operative relation to the rotor and an induction coil mounted thereon, permanent magnet means mounted on the rotor for establishing flow of magnetic flux of reversing polarity through the stator in response to rotation of the rotor, energy storing circuit means connected to the induction coil for maintaining a DC potential of one polarity thereon to conduct continuous DC and magnetically induced currents through the coil, and circuit control means for interrupting said flow of the DC current when magnetic flux of one polarity in the stator reaches peak flux density during rotation of the rotor.

2. An electrical energy converter, including a rotor, an electromagnetic device having a flux conductor stator fixedly positioned in operative relation to the rotor and in induction coil mounted thereon, permanent magnet means mounted on the rotor for establishing flow of magnetic flux of reversing polarity through the stator in response to rotation of the rotor, energy storing circuit means connected to the induction coil for maintaining a DC potential thereon to conduct DC and magnetically induced currents through the coil, and circuit control means for interrupting said flow of the DC current when magnetic flux of one polarity in the stator reaches peak flux density during rotation of the rotor, said rotor being mounted for rotation about a fixed axis, and said permanent magnet means comprising a plurality of magnets having pole faces of alternate opposite polarity angularly spaced from each other in parallel planes perpendiculcar to said fixed axis of the rotor.

3. The combination of claim 2 wherein the flux conducting stator includes an intermediate portion on which the coil is mounted and a pair of leg portions extending therefrom in straddling relation to the rotor establishing a flux path aligned with a plane in parallel, non-radial relation to the fixed axis of the rotor, said flux path plane intersecting said magnets at angular positions of the rotor corresponding to the peak flux density of the magnetic flux established in the stator.

4. The combination of claim 3 wherein said energy storing circuit means includes a DC battery having positive and negative terminals, and means connecting the induction coil between the negative terminal and the circuit control means.

5. The combination of claim 4 wherein said circuit control means includes a circuit breaking switch and a switch actuating cam driven by the rotor.

6. The combination of claim 1 wherein said energy storing circuit means includes a DC battery having positive and negative terminals, and capacitor means connecting the induction coil between the negative terminal and the circuit control means.

7. The combination of claim 1 wherein said circuit control means includes a circuit breaking switch in parallel with the capacitor means and a switch actuating cam driven by the rotor.

8. An electrical energy converter, including a rotor mounted for rotation about a fixed axis, an electromagnetic device having a flux conducting stator fixedly positioned in operative relation to the rotor and an induction coil mounted thereon, permanent magnet means mounted on the rotor for establishing flow of magnetic flux of reversing polarity through the stator in response to rotation of the rotor, energy storing circuit means connected to the induction coil for maintaining a DC potential thereon to conduct DC and magnetically induced currents through the coil, and circuit control means for interrupting said flow of the DC current when magnetic flux of one polarity in the stator reaches peak flux density during rotation of the rotor, the flux conducting stator including an intermediate portion on which the coil is mounted and a pair of leg portions extending therefrom in straddling relation to the rotor establishing a flux path aligned with a plane in parallel, non-radial relation to the fixed axis of the rotor.

9. The combination of claim 8 wherein said stator is made of laminations that extend parallel to the flux path.

10. The combination of claim 1 including output means fixedly mounted in operative relation to the magnet means on the rotor for delivering electrical energy in response to rotation of the rotor.

11. The combination of claim 10 wherein said rotor is mounted for rotation about a fixed axis, and said permanent magnet means comprises a plurality of magnets having opposite pole faces angularly spaced from each other in parallel planes perpendicular to said fixed axis of the rotor, the alternate pole faces in each of said parallel planes being of opposite polarity.

12. The combination of claim 11 wherein said output means includes a magnetic flux conducting element mounted in close spaced adjacency to the rotor to span two of the pole faces of adjacent ones of the magnets, and a power output coil mounted on said element.

13. An electrical energy converter, including a permanent magnet rotor rotatable about a fixed axis and having circumferentially spaced pole faces alternately opposite polarities, a stator through which a common flux path is established in parallel, non-radial relation to said fixed axis of the rotor, said rotor having circumferentially spaced pole faces of alternately opposite polarity aligned with the common flux path during rotation of the rotor, induction coil means mounted on the stator for conducting current induced therein by rotation of the rotor, energy storing circuit means connected to the induction coil means for maintaining a continuous DC potential across the coil means, and control means responsive to rotation of the rotor for interrupting DC current conducted through the coil means under said DC potential when alternate pole faces of one polarity are aligned with said stator.

14. An electrical energy converter, including a permanent magnet rotor rotatable about a fixed axis and having circumferentially spaced pole faces of alternately opposite polarities, a stator through which a flux path is established in parallel, non-radial relation to said fixed axis of the rotor, induction coil means mounted on the stator for conducting current induced therein by rotation of the rotor, energy storing circuit means connected to the induction coil means for conducting DC current therethrough, control means responsive to rotation of the rotor for interrupting said DC current when alternate pole faces of one polarity are aligned with said stator, a magnetic flux conducting element spaced from the stator to span two adjacent pole faces on the rotor and a power output coil mounted on said element.

15. The combination of claim 14 wherein said stator is made of laminations that extend parallel to the flux path.

* * * * *